July 23, 1968  F. H. BROOME  3,393,588
SPINDLE GROWTH COMPENSATING SYSTEM
Filed March 8, 1966
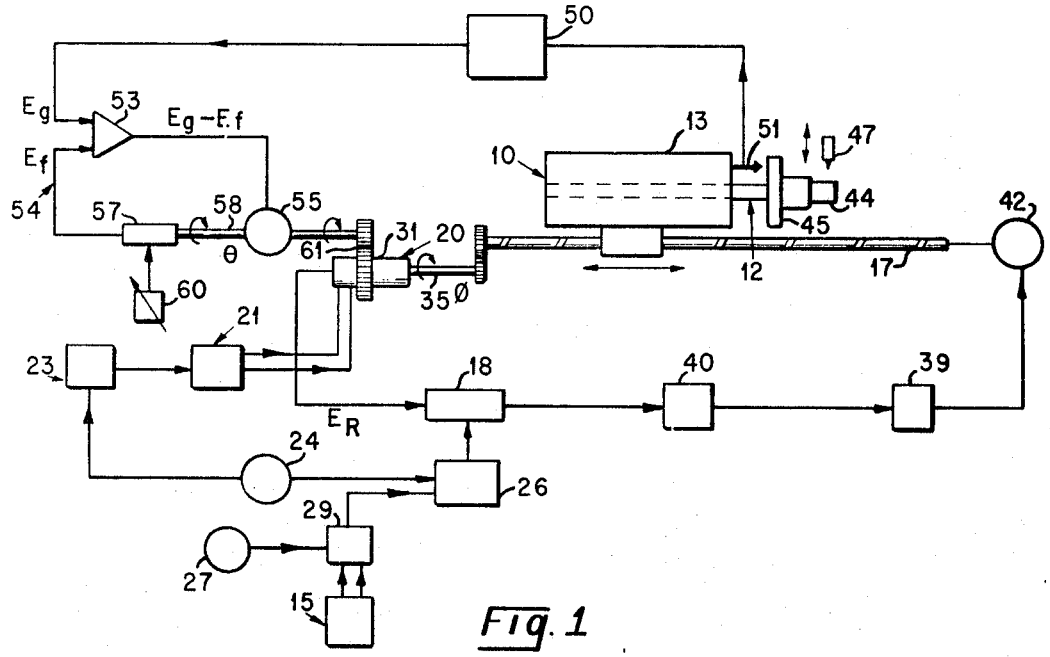
*Fig. 1*
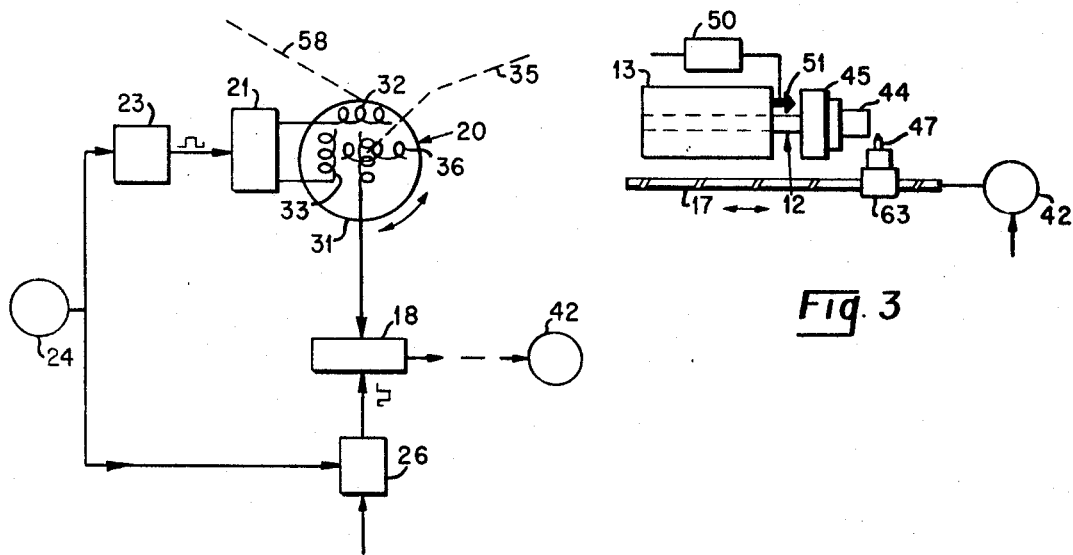
*Fig. 2*
*Fig. 3*
INVENTOR.
Frank H. Broome
BY
ATTORNEY.

United States Patent Office 3,393,588
Patented July 23, 1968

3,393,588
SPINDLE GROWTH COMPENSATING SYSTEM
Frank H. Broome, Oak Ridge, Tenn., assignor to the United States of America as represented by the United States Atomic Energy Commission
Filed Mar. 8, 1966, Ser. No. 534,976
5 Claims. (Cl. 82—2)

ABSTRACT OF THE DISCLOSURE

In a machine tool an electrical system is provided for automatically compensating for changes in spindle length resulting from temperature variations during a machining operation. A signal indicative of the change in spindle length is utilized for displacing a machine component in a direction necessary to effectively nullify the change in the spindle length.

The invention described herein was made in the course of, or under, a contract with the U.S. Atomic Energy Commission. This invention relates generally to machine tools particularly of the type having the operation thereof controlled by automatic control mechanisms, and more specifically to systems for use with such machine tools to automatically compensate for changes in the effective length of machine components due to temperature variations encountered during machine operation.

The improved precision of automatically controlled and other machine tools is reflected in an increasing need for compensating systems capable of minimizing small, but significant, errors in the position of the workpiece relative to the cutting or machining tool. For example, various systems and operating techniques have been heretofore employed with lathes for minimizing the expansion which lathe spindles normally undergo during operation. This expansion, which is caused primarily by the heat generated in the spindle bearings, is variable and therefore cannot be readily compensated for in advance. Spindle growth is highly objectionable in precision machining because axial growth of the spindle correspondingly changes the axial position of the spindle chuck and therefore the workpiece carried by the chuck. Tests have shown that during normal operation in an air-conditioned room some lathe spindles increase in axial length by as much as 0.0025 of an inch. This amount of spindle growth results in an error in the assumed position of the workpiece that is intolerable for many of the modern day precision machining operations.

Several attempts have been previously made to solve the above spindle growth problem. For example, one of the previous solutions is to energize the lathe system, but defer any machining until the spindle temperature has stabilized. However, stabilization by this means in some cases requires hours and is based on the somewhat erroneous assumption that conditions affecting the temperature of the spindle remains constant during machining. In addition, many precision machine tools are equipped with a "constant surface speed" feature which changes the spindle speed, as a function of workpiece diameter, while the cut is in progress. Consequently, the temperature of such spindle arrangements never stabilized at a temperature which may be considered a constant operating temperature. Another approach to a possible solution to this problem is to operate the lathe continuously, but in practice some shutdowns of the lathe cannot be avoided. Another and more satisfactory approach for a solution to this problem as previously practiced is to cool the spindle system with a fluid such as air or liquid. Such fluid cooling, however, requires a specially designed and intricate spindle assembly and does not completely eliminate spindle growth, since adequate cooling of the sources of heat generation, e.g., the spindle bearings, is virtually impossible.

The present invention aims to overcome the above and other shortcomings or problems suffered by the previously known spindle cooling or growth compensating arrangements by providing a unique system wherein a change in the axial position of the workpiece due to spindle growth is detected and provides a signal corresponding to such growth. This signal may, in turn, be fed into a machine control system for effectively restoring a workpiece to its original or desired position with respect to the particular cutting tool or other working machining mechanism. This restoration of the workpiece position by the present invention may be achieved by using the signal resulting from spindle growth for adjusting the machine control system in such a manner as to move the spindle or the cutting tool in an axial direction a distance sufficient to, in effect, overcome or nullify any changes in the assumed relationship of the workpiece to the particular tool employed in the machine caused by spindle growth.

An object of the present invention is to provide a new and improved means for compensating for changes in the effective length of machine components of various machining mechanisms during the operation thereof.

Another object of the present invention is to provide means or a system for automatically adjusting tool position or workpiece position to compensate for changes in spindle length resulting from increasing or decreasing temperatures during a machining operation.

Another object of the present invention is to provide a system responsive to changes in the effective length of machine tool components for adjusting signals from an automatic machine control mechanism to compensate for such changes.

A further object of the present invention is to provide a system capable of maintaining a workpiece in a desired position irrespective of changes in the effective axial length of a machine tool spindle or another machine component which carries and effects angular movement of the workpiece.

A still further object of the present invention is to provide a system for essentially nullifying or negating changes in spindle length at any stage of a machining operation.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications are best adapted to the particular use contemplated.

In the accompanying drawing:

FIG. 1 is a schematic view of an automatically controlled lathe incorporating the spindle growth compensating system of the present invention;

FIG. 2 is a schematic view showing in diagrammatic form details of the novel resolver system utilized with the present invention; and FIG. 3 is a view showing a modification of the FIG. 1 embodiment for maintaining workpiece position irrespective of changes in the axial length of the lathe spindle.

In order to describe the present invention in a more facile manner, the present invention will be hereinafter described as being used in a lathe utilizing a suitable commercially available control system, e.g., a numerical control, for automatically controlling machining operations by selectively moving the cutting tool along the X and Y axes of the lathe bed. Or, if desired, the control system may move the cutting tool along the X-axis and a workpiece-carrying spindle along the Y-axis. This axially movable spindle along with its housing is selectively mounted on the lathe bed for movement by a Y-axis lead screw.

Referring now to FIGS. 1 and 2, the present invention is shown with an automatically controlled lathe mechanism generally indicated at 10, in which a spindle 12 is rotatably mounted in housing 13 and movable therewith along a Y-axis of the lathe bed to provide desired positioning of a workpiece carried by the spindle 12 with respect to a cutting tool which may be secured to and movable by an X-axis lead screw (not shown). In a conventional commercially available machine tool control system capable of automatically controlling the machining operation of the lathe, signals from taped instructions or similar such program means may be fed into the lathe operating mechanism from a suitable command station such as generally indicated by block 15. The position of the Y-axis lead screw 17 is controlled by a servo error voltage which is generated by a phase detector 18. This servo error voltage is proportional to the cosins of the phase difference between two input signals or voltages-namely, a Y-position command signal from programmed instructions in command station 15 and a Y-position feedback voltage derived from a resolver 20. The phase of this latter voltage varies or changes in response to changes in the angular position of the lead screw 17. Basically, the resolver 20 is an electromagnetic device capable of performing trigonometric computations to provide the feedback voltage and generally comprises a transformer having stator and rotor windings with a rotary, variable coupling provided between these windings. A voltage signal for the stator windings in the resolver is derived from a voltage source or resolver supply 21 having an input supplied by a reference counter 23. The voltage output of this reference counter 23 may be a 200-cycle-per-second (c.p.s.) square wave provided by a suitable clock oscillator generally indicated at 24. The other voltage input into the phase detector 18, i.e., the Y-slide or lead screw position command signal provided by the programmed tape or other control in command station 15, may also be a 200-c.p.s. square wave derived from a command counter 26. This counter 26 generates the square wave of the output of the clock oscillator 24 and is coupled to command station 15 to receive Y-position command pulses from a control circuit which may include a pulse generator 27 and a pulse gate 29. Each of these command pulses gated through gate 29 to the command counter 26 is capable of shifting the phase of the Y-position command signal by a given small amount relative to the output of the reference counter 23. The direction of this phase shift is determined by the "sign" (+ or —) of the command pulse. The phase difference between the outputs of the reference counter and the command counter comprises the "distance command" to the Y-slide or lead screw 17, whereas the rate of change in the phase difference comprises the "velocity command" to the Y-slide 17.

The gating of the command pulses to the command counter 26, and the "sign" of these pulses, are controlled by the tape or other control medium in command station 15. For example, a tape used for such control may be punched with binary coded "drive" information for the Y-axis lead screw 17. A supplementary channel on the same tape may be punched with "sign" information to dictate direction of Y-slide movement. A train of these command pulses are gated by gate 29 to the command counter 26 for moving the Y-axis lead screw at a preselected rate in a given direction until this voltage is removed. A servo error voltage is proportional to the cosine of the phase difference between two input voltages—namely, a Y-position command signal and a Y-position feedback voltage provided by the resolver 20 due to its coupling with the lead screw 17. In order for the resolver to provide this feedback voltage it preferably comprises, as shown in FIG. 2, a body or housing 31 containing therein a pair of primary or stator windings 32 and 33 disposed 90° apart from each other and a rotor 35 carried by and rotatably disposed in the housing 31. This rotor 35 has mounted thereon the rotor windings or secondary windings 36. Thus, when sine waves 90° apart are coupled to the stator windings from the resolver supply 21, the amplitude of the output voltage is relatively constant, no matter what angle the windings 36 on the rotor 35 are in relationship to the stator windings 32, 33 carried by the housing 31. However, angular displacement between the stator and the rotor windings due to rotation of or angular movement of the lead screw 17 and, therefore, the rotor 35, induces a signal phase-shift in the rotor windings. This phase-shifted signal is then fed to the phase detector 18 for effecting desired angular displacement of the lead screw 17. The output of the phase detector 18 includes a D.C. component, or servo error voltage, which is coupled to and operates a servo valve 39 through a suitable amplifier 40. Servo valve 39 in turn controls the operation of a hydraulic motor 42 for driving the Y-axis lead screw 17. The servo error voltage is at any time proportional to the sign and magnitude of the error in the resolver shaft or rotor angle, i.e., to the difference between the rotor angle called for by the distance command and the measured rotor angle. Therefore, the hydraulic motor 42 responds to error voltage for driving the lead screw 17 and the resolver shaft in the direction required to reduce the servo error voltage to zero and thereby terminate the operation of the hydraulic motor 42. As briefly mentioned above, the axial positioning of a tool or spindle housing carried by the Y-axis lead screw 17 is dependent upon resolver feedback voltage. Thus, the present invention provides a novel system using this principle for detecting changes in the axial position of a workpiece 44 secured to the spindle 12 by a suitable chuck 45 and utilizing asignal resulting from such detection for adjusting the resolver feedback voltage to, in effect, restore the workpiece 44 to its original position. The original position of the workpiece is determined by its relationship in a particular axial positon to the programmed or preselected postion of a cutting tool such as shown at 47. The restoration or movement of the workpiece 44 to its original position may be achieved by moving the spindle housing 13 together with the spindle 12 by means of the Y-axis lead screw 17 which may be coupled to the housing 13 as shown in FIG. 1.

In order to detect spindle growth or changes in the axial position of the workpiece during operation, a suitable signal producing device may be disposed between the housing 13 and the chuck 45 on the spindle for providing a signal when relative movement in an axial direction occurs between the spindle and the housing. For example, a suitable signal producing device or sensor may comprise a commercially available and essentially linear capacitance gauge 50 having a probe 51 mounted on or carried by the housing 13 of the spindle and disposed adjacent to the rear face of the chuck 45 to sense axial movement of the chuck relative to the housing. The portion of the probe disposed in close proximity to the chuck 45 should be such that relative movement therebetween due to chuck rotation will not affect or otherwise detract from the operation of the capacitance gauge. The output or signal from the gauge 50 is preferably a D.C. voltage $Eg$, the amplitude of which is proportional to the axial displacement between the chuck 45 and the housing 13.

The gauge output voltage $Eg$ may be fed into a servo amplifier 53 forming part of a standard D.C. servo loop generally indicated at 54, which may also include a servo motor 55, a feedback potentiometer 57 coupled to a shaft 58 of the servo motor 55, and an adjustable power supply 60 for the potentiometer 57. As shown in FIG. 1, the potentiometer output $Ef$ is fed into the amplifier 53 and the amplifier output $Eg-Ef$ operates the servo motor 55. The servo motor shaft 58 may be coupled through a precision gear train 61 characterized by low friction and virtually no backlash to the housing 31 of the resolver 20 for rotating the housing 31 relative to the resolver rotor 35 in response to the amplifier output. This assemblage and operation of the resolver 20 are contrary to the usual practice in that the resolver housing 31 is normally clamped or otherwise maintained in a fixed position.

The resolver rotor 35 is coupled by a suitable shaft to the Y-axis lead screw 17 so that rotation of the lead screw 17 rotates the resolver rotor 35 through an angle $\phi$ proportional to the Y-position command signal. The feedback voltage $E_R$ from the rotor 35 is fed into the phase detector 18 for providing a phase comparison of $E_R$ and the Y-axis command signal in order to generate the servo error voltage. The servo amplifier 53 has one of its outputs—namely, $Eg$—proportional to the axial displacement of the chuck 45 relative to the spindle housing 13. The input $Ef$ from the power supply 60 is, in turn, proportional to the angle of rotation $\phi$ of the resolver body from a preset position as will be described in detail below. The output of the amplifier 53, $Eg-Ef$ (when $Eg$ and $Ef$ are of equal amplitude) is nearly zero and can be expressed as $K_1D - K_2\theta \simeq 0$, where $K_1$ and $K_2$ are circuit constants, D is axial displacement, and $\theta$ is the angle of resolver housing rotation. Rearrangement of this equation gives $\theta \simeq DK_1/K_2$. Thus, $\theta$ is essentially proportional to the axial displacement of the workpiece.

To provide the spindle growth compensating system with an initial adjustment prior to operation of the lathe 10, the lathe spindle assembly, including the chuck 45 and the workpiece 44, may be moved to a preselected reference or "zero" position with respect to the spindle housing 13. At this time the displacement between the probe 51 of gauge 50 and the chuck 45 may be adjusted manually or by any other suitable means to a selected value, e.g., 0.005 of an inch, and the voltage supply 60 for the potentiometer 57 adjusted to offset or null the gauge voltage $Eg$. Thus, the output of amplifier 53 is now essentially zero. The housing 31 of the resolver 20 may be set manually or by any other suitable means to a position $\theta = 0$ where the phase of the resolver feedback voltage $E_R$ is proportional to $\phi$, i.e., the angular position of the resolver rotor 35. Rotation of the resolver housing 31 from this $\theta = 0$ position will change the angular displacement of the resolver rotor 35 and housing 31, thereby changing the phase of the feedback voltage $E_R$.

In a typical operation of the spindle growth compensating system of the present invention, after calibration as described above has been effected, expansion of the lathe spindle 12 due to increasing spindle operating temperatures produces an increase "I" in a preset displacement between the spindle housing 13 and the chuck 45. This displacement produces a corresponding increase in $Eg$. As a result, the servo loop 54 effects rotation of the resolver housing 31 to produce a proportional increase in the angular displacement between the resolver housing 31 and the resolver rotor 35. This displacement, in turn, produces an increase in the phase difference between the resolver feedback voltage $E_R$ and the reference command signal. This phase shift in $E_R$ is sensed by the phase detector 18, which responds by increasing the servo error voltage sufficiently to actuate the motor 42 for moving the spindle assembly rearwardly by the amount "I."

Thus, despite changes in the axial length of the spindle 12, the compensating system of the present invention keeps the chuck 45 in virtually the same preselected axial position with respect to the cutting tool 47. Therefore, the workpiece 44 is effectively maintained in a location corresponding to an assumed reference position programmed into the machining directions irrespective of variations in the axial length of the spindle 12.

As described above, the spindle growth compensating system offsets or nullifies the spindle growth by moving the entire spindle assembly which includes the spindle, housing, probe, and workpiece in an axial direction by the amount corresponding to the amount of spindle growth. This assures that the workpiece position is virtually unchanged during machining operations. The probe-to-chuck spacing and the signals $Eg$ and $Ef$ are not restored to their initial values by this movement, but remain at some larger values effected by and corresponding to the preset spacing plus the increase in the length of the spindle.

While the spindle growth compensating system of the present invention has been described as being used with an arrangement wherein the spindle housing is axially moved by the Y-axis lead screw of the lathe, it will appear clear that the present invention may be used with other machining mechanisms having spindles or other rotatable components affected by increasing or decreasing temperatures during the operation thereof. Accordingly, the term "spindle" as used herein is not intended to be restrictive to lathe spindles, but is intended to incorporate other rotatable machine components, such as, for example, mandrels, turntables, etc. Also, it will be clear that the spindle housing may be fixed to the lathe body and the adjustments required by changes in the axial position of the workpiece due to spindle growth be provided by coupling the Y-axis lead screw 17 to the cutting tool 47 by a suitable attachment such as shown in FIG. 3 at 63.

It will be seen that the spindle growth compensating system of the present invention provides a number of unique advantages for providing high-precision machining. For example, it permits machining operations to be conducted immediately after startup, since it is not necessary to wait for the temperatures of the machine to stabilize at some operating temperature which may or may not be substantially constant. Also, compensation is provided for any changes in spindle length resulting from variations in temperatures in the machine components irrespective of whether such changes result from increasing or decreasing temperatures. Machining operations need not be hurried to avoid errors resulting from temperature variations since such variations are automatically compensated for. Further, the increase in precision provided by the present invention is substantial since tests have shown that with a lathe operating in normal, controlled environments spindle length normally varies by as much as 0.00025 of an inch, whereas with lathes using the present invention spindle growth variations are maintained to within about 0.0001 of an inch.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

I claim:

1. A spindle growth compensating system for use with a machine having a housing carrying a spindle in a rotatable manner for supporting and rotating a workpiece disposed in a working relationship with a selectively movable machine tool, said system comprising signal means operatively coupled to the housing and the spindle for producing a signal when relative movement in an axial direction occurs between the spindle and the housing with the amplitude of said signal being proportional to said movement, slide means coupled to at least one of the housing and the machine tool for effecting movement thereof in the axial direction, drive means for driving said slide means, means for producing a voltage corresponding to a command signal, means for producing a voltage corresponding to a reference signal, means coupled to said signal means and said drive means and adapted to receive the command and reference signals for producing a voltage in response to a phase difference between the command signal and the reference signal with the phase of the reference signal being determined by the amplitude of the signal from said signal means and the position of said slide means, said drive means responsive to the last-mentioned voltage for moving one of the housing and the machine tool in an axial direction to nullify the axial movement produced by the relative movement between the spindle and the housing.

2. A spindle growth compensating system as claimed in claim 1, wherein another signal means is coupled to the first-mentioned signal means for nullifying a signal from the latter between successive changes in amplitude thereof, and wherein the amplitude of the signal from said other signal means is responsive to changes in the amplitude of the signal from the first-mentioned signal means for nullifying the latter.

3. A spindle growth compensating system as claimed in claim 2, wherein the means coupled to said signal means and said drive means comprises a resolver which includes a rotatable body carrying primary windings and a rotatable shaft in the body carrying secondary windings and coupled to said slide means for rotation thereby, and wherein another drive means is coupled to said body for effecting rotation thereof in response to the changed signal from the first-mentioned signal means for changing the phase of said reference signal and for changing the signal from said other signal means to a value corresponding to the amplitude of the signal from the first-mentioned signal means.

4. A spindle growth compensating ssytem as claimed in claim 3, wherein an amplifying means is coupled to the first-mentioned signal means, said other signal means, and said other drive means for actuating the latter in response to changes in the amplitude of the signal from the first-mentioned signal means prior to the nullification thereof by the signal from said other signal means.

5. A spindle growth compensating system as claimed in claim 2, wherein a chuck for supporting the workpiece is carried by the spindle at a location spaced from said housing, and the first-mentioned signal means comprises an essentially linear capacitance gauge having a probe carried by the housing and disposed in close proximity to the chuck to sense variations in the spacing between the housing and the chuck that corresponds to said axial movement.

References Cited
UNITED STATES PATENTS

| | | | |
|---|---|---|---|
| 2,937,325 | 5/1960 | Garber | 90—13 |
| 2,988,681 | 6/1961 | Bower | 90—13 |
| 3,347,116 | 10/1967 | Anderson et al. | 318—18 |
| 3,340,447 | 9/1967 | MacDonald | 82—2 XR |

LEONIDAS VLACHOS, *Primary Examiner.*